United States Patent

[11] 3,548,914

| [72] | Inventors | Harold T. Hill;<br>Henry G. Parker; Anthony C. Mitchelmore,<br>Lymington, England |
|------|-----------|-----------|
| [21] | Appl. No. | 642,216 |
| [22] | Filed | May 29, 1967 |
| [45] | Patented | Dec. 22, 1970 |
| [73] | Assignee | Wellworthy Limited<br>Lymington, England<br>a British Company |
| [32] | Priority | June 6, 1966 |
| [33] | | Great Britain |
| [31] | | 25,169/66 |

[54] SOLUBLE CORE FABRICATION
10 Claims, No Drawings

[52] U.S. Cl. ..................................... 164/41,
106/38.3, 164/16, 164/369;
[51] Int. Cl. ..................................... B22c 1/18
[50] Field of Search........................................ 164/16,
20, 22, 36, 41, 138, 369, 35/(Recent), 79/(Recent);
106/38.3, 38.9; 264/317

[56] References Cited
UNITED STATES PATENTS

| 1,603,262 | 10/1926 | Alden............................ | 18/45 |
| 3,209,421 | 10/1965 | Shepherd...................... | 164/16 |
| 3,356,129 | 12/1967 | Anderko et al................ | 164/138 |
| 3,459,253 | 8/1969 | Woolcott....................... | 164/369X |

FOREIGN PATENTS

| 781,328 | 8/1957 | Great Britain................ | 164/16 |

*Primary Examiner*—J. Spencer Overholser
*Assistant Examiner*—R. Spencer Annear
*Attorney*—Holcombe, Wetherill & Brisebois ABSTRACT: The present invention relates to soluble cores for use in the art of casting metals and provides a method of making a soluble core comprising a mixture of sodium chloride and sodium silicate, or sodium sulfate and sodium silicate, wherein said mixture is blown or rammed into a core box, whereafter the sodium silicate is gelled to strengthen the core for handling, and the core is further hardened by baking for a period of time.

SOLUBLE CORE FABRICATION

The present invention relates to soluble cores for use in the art of casting metals. The term "soluble core" as used herein means a core formed either entirely or mainly of constituents which are soluble in water, so that the core may be removed from a casting formed therearound by dissolving the soluble constituents in water, which also serves to wash away any insoluble constituents present in the core material.

It has already been proposed to manufacture a water soluble core by melting and casting water soluble salts such as sodium chloride or sodium sulfate, or mixtures of water soluble salts. However, such cores as previously proposed possess two major disadvantages. Firstly, the dissolution time of the core is relatively long, particularly where the core is defining a narrow cavity or passage. Secondly, if there are any entrapped air pockets or voids in the core as cast, these can give rise to gassing troubles during the casting of a metal around the core, as it is extremely difficult to vent such a core to give an easy passage to gas.

It is an object of the present invention to provide improved soluble cores in which the aforementioned disadvantages are reduced or avoided.

The invention provides a soluble core for use in metal casting comprising a mixture of sodium chloride and sodium silicate, or sodium sulfate and sodium silicate, which is blown or rammed into a core box, whereafter the sodium silicate is gelled to strengthen the core for handling, and the core is further hardened by baking for a period of time. The sodium silicate is preferably gelled by permeating the mixture in the core box with carbon dioxide gas, or alternatively the sodium silicate may be gelled and the mixture hardened by baking the core and core box in air. The gelling of the sodium silicate provided an effective bond for the core.

The core box may be preheated to a temperature within the range 100°—180° C, preferably 120°—140° C, and the baking step is also carried out within the temperature range 100°—180° C. The period for which the core is baked may vary between 20 and 60 minutes, depending upon the size of the core. Throughout the following description and in the claims, all percentages are by weight of the mixture.

Preferably the mixture comprises from 3 to 10 percent of sodium silicate and may also include silica gel in ground form and which comprises up to 5 percent of the mixture.

The sodium chloride or sodium sulfate used in the mixture is in granular form and this may be milled to give an admixture of grain sizes to promote green strength in the core.

One preferred sieve analysis is:
B.S. sieve size: Percentage

| | |
|---|---|
| Passes 40, retained by 60 | 50 |
| Passes 60, retained by 80 | 30 ± 10% |
| Passes 80, retained by 100 | 20 |

Another preferred sieve analysis is:
B.S. sieve size:

| | |
|---|---|
| Passes 40, retained by 60 | 60 ± 15 |
| Passes 60, retained by 100 | 40 ± 15 |

Such sodium chloride or sodium sulfate of graduated grain size is blended with from 3 to 10 percent of sodium silicate and may also be blended with 0 to 5 percent of ground silica gel. The resultant mixture may then be either blown or rammed into a nonheated core box and gassed with carbon dioxide, to strengthen the core, then removed from the core box and baked for a period of time; or blown or rammed into a preheated core box and gassed with carbon dioxide, then removed from the core box and baked, as has been described. Alternatively, the mixture may be blown or rammed into a preheated core box and both the core and core box baked for a period of time prior to the removal of the core from the core box.

In forming soluble salt cores according to this invention the core box is made of metal, at least in cases where it has to be preheated, but it may be made of wood when preheating is not employed and a cheaper core box is required.

According to a further feature of the invention, the green strength of the core may be improved by adding from 2 to 12 percent of kaolin (china clay) powder to the sodium chloride or sodium sulfate prior to the addition of the sodium silicate. This substantially increases the strength of the core particularly at high temperatures when metal is being cast around the core. Although the core composition is not now totally soluble, due to the presence of the kaolin, the soluble salt can still be readily dissolved in water and the kaolin powder flushed away by the water.

It will be understood that the cores may also be provided with reinforcing means where and if required, such as by metal wires, around which the core material is formed.

The soluble cores produced according to this invention have a satisfactory hardness and strength for foundry use, whilst retaining gas permeability and also allowing the application of normal foundry core venting techniques, whereby they do not give rise to gassing problems during the casting of metal around the core. At least the major constituents of the cores are also extremely soluble in cold water, whereby they may be dissolved much more rapidly than cores made by casting a molten salt.

We claim:

1. A method of making a water soluble core for use in metal casting, said core comprising a mixture of sodium silicate with a sodium salt selected from the group consisting of the chloride and the sulfate, which comprises the steps of:
   depositing said mixture in a core box;
   gelling the sodium silicate in order to strengthen the core for handling; and
   subsequently baking the core to further harden it to a desired degree.

2. A method as claimed in claim 1, wherein the mixture is blown or rammed into a core box, gassed with carbon dioxide to strengthen the core, then removed from the core box and baked for a period of up to one hour.

3. A method as claimed in claim 2, wherein the core box is preheated.

4. A method as claimed in claim 1, wherein the mixture is blown or rammed into a preheated core box, and both the core and the core box are then baked in air for a period of up to one hour to both strengthen and harden the core, prior to removal from the core box.

5. A method as claimed in claim 3, wherein the core box is preheated to a temperature within the range 100°—180° C.

6. A method as claimed in claim 1, wherein the baking step is carried out within the temperature range 100°—180° C.

7. A method as claimed in claim 1, wherein the sodium chloride or sodium sulfate used in the mixture is in granular form and comprises a predetermined admixture of grain sizes to promote green strength in the core.

8. A method as claimed in claim 1, wherein the mixture comprises from 3 to 10 percent of sodium silicate.

9. A method as claimed in claim 1, wherein the mixture also includes from 0 to 5 percent of ground silica gel.

10. A method as claimed in claim 1, wherein the mixture also includes from 2 to 12 percent of kaolin (china clay) powder.